(12) United States Patent
Bowman

(10) Patent No.: US 7,473,057 B1
(45) Date of Patent: *Jan. 6, 2009

(54) CUTTING MACHINE

(76) Inventor: Thomas W. Bowman, 1575 Braggtown Rd., East Berlin, PA (US) 17316

( * ) Notice: Subject to any disclaimer, the term of this patent is extended or adjusted under 35 U.S.C. 154(b) by 0 days.

This patent is subject to a terminal disclaimer.

(21) Appl. No.: 11/881,936

(22) Filed: Jul. 30, 2007

Related U.S. Application Data

(63) Continuation of application No. 11/360,261, filed on Feb. 23, 2006, now Pat. No. 7,249,918.

(60) Provisional application No. 60/655,704, filed on Feb. 23, 2005.

(51) Int. Cl.
*B23C 1/20* (2006.01)
*F16H 29/20* (2006.01)

(52) U.S. Cl. .................. 409/132; 409/143; 409/185; 408/137; 74/89.29; 74/89.3; 74/89.38; 74/89.34; 74/89.31; 74/89.39

(58) Field of Classification Search ......... 409/131–132, 409/143, 185, 190, 211, 231; 408/137, 129, 408/132, 124; 74/89.38, 89.29, 89.23, 89.34, 74/89.39, 89.3, 89.31
See application file for complete search history.

(56) References Cited

U.S. PATENT DOCUMENTS

| | | | |
|---|---|---|---|
| 2,860,266 A * | 11/1958 | Schrader | 74/89.34 |
| 2,942,092 A | 6/1960 | Cammann | |
| 3,407,680 A * | 10/1968 | Westmoreland | 74/89.3 |
| 3,464,313 A | 9/1969 | Shay et al. | |
| 3,530,734 A * | 9/1970 | Wray et al. | 74/89.3 |
| 3,587,194 A | 6/1971 | Brown | |
| 3,803,927 A | 4/1974 | Lawler | |
| 4,197,908 A | 4/1980 | Davis et al. | |
| 4,442,891 A | 4/1984 | Wood | |
| 4,577,388 A | 3/1986 | Wood | |
| 4,592,681 A | 6/1986 | Pennison et al. | |

(Continued)

OTHER PUBLICATIONS

Pending U.S. Appl. No. 11/061,125 by Thomas W. Bowman, filed Feb. 14, 2005.

(Continued)

*Primary Examiner*—Erica E Cadugan
(74) *Attorney, Agent, or Firm*—Roger N. Chauza P.C.

(57) ABSTRACT

Cutting apparatus having a ram axis gear tube (32) equipped with internal threads engageable with external threads (48) of a main shaft (42). A tool can be fixed to the main shaft (42). The external threads (48) of the main shaft (42) are formed on external splines (44). A main shaft rotation gear (46) has internal splines (41) mating with the external splines (44) of the main shaft (42). Rotation of the ram axis gear tube (32) thus causes the main shaft (42) to move axially via the internal and external threads. Rotation of the main shaft rotation gear (46) causes rotation of the main shaft (42). The tool fixed to the main shaft (42) can thus undergo axial and rotational movements. A motor (74) can be coupled to the main shaft (42) and a motor shaft (63) extended through the ram axis gear tube (32) and the main shaft (42). The motor shaft (63) can drive a linear gear (68) of a cross slide assembly (24) and thus radially move a tool fixed to the cross slide assembly (24).

20 Claims, 6 Drawing Sheets

U.S. PATENT DOCUMENTS

| | | | |
|---|---|---|---|
| 4,648,454 A | 3/1987 | Yarnell | |
| 4,657,449 A | 4/1987 | Marich et al. | |
| 4,657,450 A | 4/1987 | Forner et al. | |
| 4,701,988 A | 10/1987 | Wood | |
| 4,773,115 A | 9/1988 | Smith | |
| 4,785,512 A | 11/1988 | Sigel | |
| 4,819,721 A | 4/1989 | Long, Jr. | |
| 4,939,946 A * | 7/1990 | Teramachi | 74/89.3 |
| 4,986,314 A | 1/1991 | Himmler | |
| 5,054,187 A | 10/1991 | Sigel | |
| 5,062,187 A | 11/1991 | Bromley | |
| 5,088,553 A | 2/1992 | Ralston et al. | |
| 5,100,271 A | 3/1992 | Kameyama et al. | |
| 5,105,882 A | 4/1992 | Ralston et al. | |
| 5,197,540 A | 3/1993 | Yagi et al. | |
| 5,249,656 A | 10/1993 | Yanagisawa | |
| 5,318,395 A | 6/1994 | Driver | |
| 5,351,797 A | 10/1994 | Lawson et al. | |
| 5,368,423 A | 11/1994 | Hanna | |
| 5,378,092 A | 1/1995 | Griner | |
| 5,408,883 A | 4/1995 | Clark, Jr. et al. | |
| 5,540,613 A | 7/1996 | Kamiyama et al. | |
| 5,649,451 A * | 7/1997 | Ruland | 74/89.3 |
| 5,899,796 A | 5/1999 | Kamiyama et al. | |
| 5,960,882 A | 10/1999 | Polivka | |
| 6,202,506 B1 | 3/2001 | Storck et al. | |
| 6,386,797 B1 | 5/2002 | Gearhart | |
| 6,599,272 B1 | 7/2003 | Hjertman et al. | |
| 7,249,918 B1 * | 7/2007 | Bowman | 409/132 |

OTHER PUBLICATIONS

Website Printout of "Kangaroo & Giant Kangaroo Lateral Reinstatement Cutters" by Cues, Inc., 2 pages, Apr. 2006.

* cited by examiner

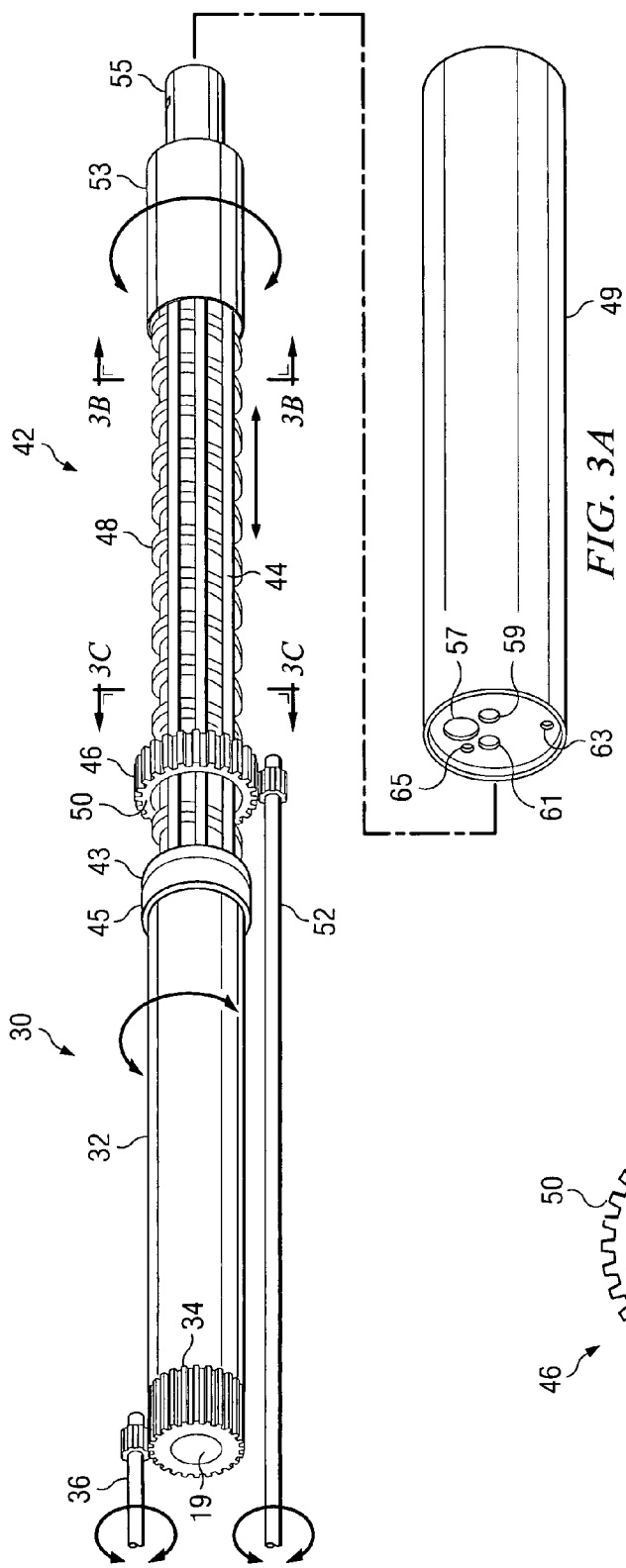
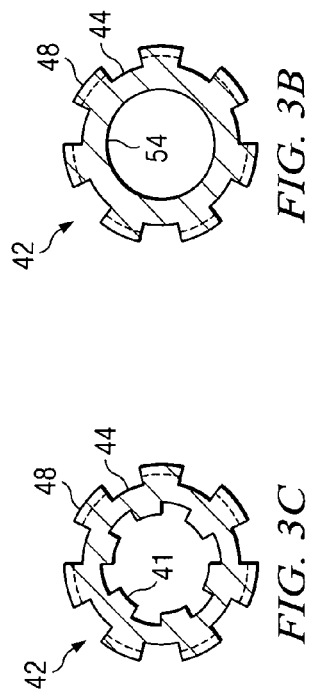
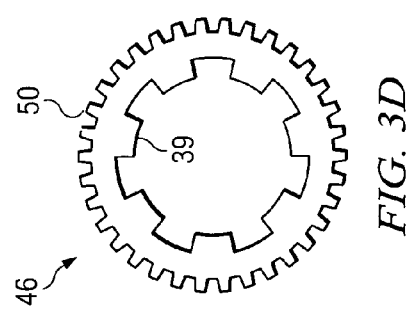

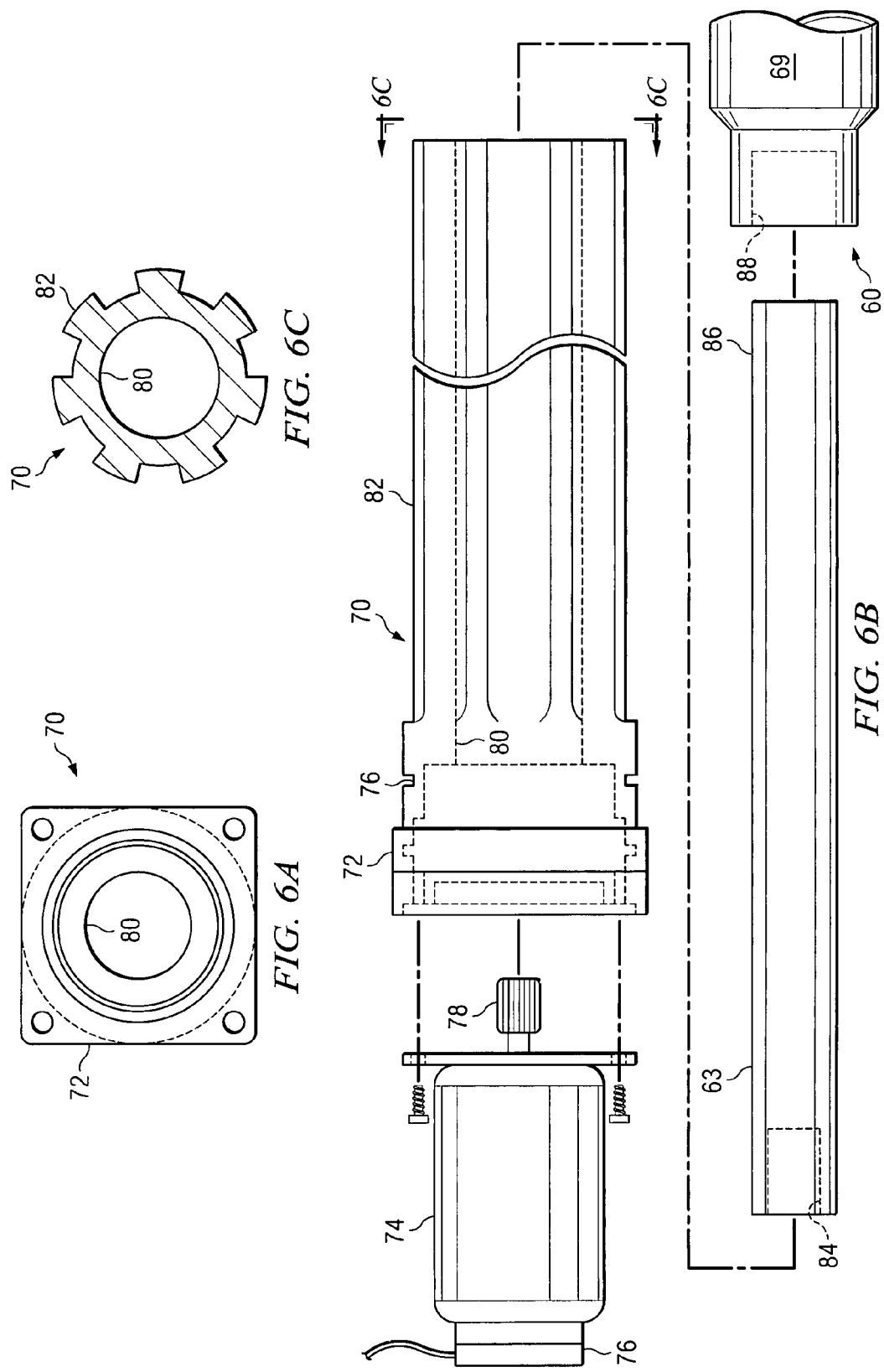

CUTTING MACHINE

RELATED APPLICATIONS

This non-provisional patent application is a continuation of U.S. non-provisional patent application entitled "Cutting Machine," filed Feb. 23, 2006 Ser. No. 11/360,261, now U.S. Pat. No. 7,249,918, which claims the benefit of provisional application entitled "Cutting Machine," filed Feb. 23, 2005, Ser. No. 60/655,704, and the entire disclosures of such applications are incorporated herein by reference.

TECHNICAL FIELD OF THE INVENTION

The present invention relates in general to machine tools, and more particularly to a cutting machine that has a cutter mounted to a rotating shaft, where the shaft moves longitudinally.

BACKGROUND OF THE INVENTION

Many different types of cutting tools are available for use in a variety of applications. In most industrial situations, either the cutter is rotated or otherwise moved, and the workpiece is maintained stationary. In other situations, the cutter is stationary and the workpiece is rotated or otherwise moved. In yet other applications, both the cutter and the workpiece may be moved at the same time.

Reinstatement cutting machines are special applications where a cutter is utilized for cutting an opening in a plastic liner installed in a deteriorated underground pipe, e.g., a main. The reinstatement cutting machine is moved through the lined main until it is at a location where a lateral pipe connects to the main pipe. The plastic liner previously installed in the main covers the opening to each lateral pipe. The function of the reinstatement cutting machine is to cut a circular opening in the plastic liner where the lateral pipe opens into the main pipe. This operation reinstates the ability of fluids to flow from the lateral pipe into the lined main pipe.

Cutters mounted to reinstatement cutting machines generally rely on three degrees of motion, including a radial motion with regard to the axis of the main pipe, rotational movements in a plane orthogonal to the axis of the main pipe, and axial movements along the axis of the main pipe. Often, the longitudinal movements of the reinstatement cutting machine itself provide one direction of movement of the cutter. The bit of the cutting machine can be mounted to a platform that provides radial movement of the bit toward the sidewall of the liner, as well as rotational movements during the cutting operation. In other types of cutting machines, the platform can be constructed to provide all three types of movements of the bit to accomplish the cutting of a hole in the liner to provide an opening to the lateral. Because the reinstatement cutting machine is moved along the liner of the main, it cannot be directly controlled or observed. Accordingly, remote controls are used to remotely control the various movements of the cutting machine. Video cameras are typically used ahead of the cutting machine to allow the cutting operation to be viewed remotely by the operator of the remote controls.

As can be appreciated, when the reinstatement cutting machine is moved into an underground pipe, the entire mechanism, including the cutter itself, must be very reliable. Otherwise, the entire apparatus must be removed from the pipe, which is not often easy, as a cutter may fail or the mobility of the cutting machine may be lost, while the bit is extended radially into the sidewall opening of the main pipe. The bit mechanism is sometimes destroyed during the forceful removal of the reinstatement cutting machine from the main pipe. In other situations, the reinstatement cutting machine and any associated camera equipment must be removed from the main pipe if the bit of the cutter fails. The bit can fail if it becomes dull, broken or becomes loose from its mounting chuck. As can be appreciated, the more complicated a cutter becomes, the more likely a failure will occur. In addition, the more complicated the design and construction of a cutter, the more costly the device becomes.

From the foregoing, it can be seen that a need exists for cutter apparatus that has fewer parts than prior cutters, is more reliable and is more cost effective. Another need exists for a cutter that provides radial and rotary movements to the cutting bit. Yet another need exists for machine apparatus adapted for efficiently moving a tool in various directions.

SUMMARY OF THE INVENTION

In accordance with the principles and concepts of a preferred embodiment of the invention, there is disclosed a ram and rotate/feed assembly. The assembly includes a ram axis gear tube and a main shaft to which a tool can be attached. The ram axis gear tube and the main shaft telescopically move with respect to each other, thus moving the tool in an axial direction. The main shaft is splined and can thus be rotated, thus moving the tool in a rotary direction. Yet another degree of movement of the tool can be achieved by mounting a cross slide assembly to the main shaft, and mounting the tool to the cross slide assembly. The cross slide is adapted to move the tool in a radial direction. A motor or other drive mechanism includes a drive shaft extended through the ram axis gear tube and the main shaft to drive the cross slide assembly.

In accordance with another feature of the invention, the ram and rotate/feed assembly is constructed so that the tool can be simultaneously rotated, made telescopically extended or retracted, or moved in a radial direction. In accordance with another feature, the tool can be spun at a high speed.

In accordance with yet another feature of the invention, disclosed is apparatus for moving a tool. The apparatus includes a ram axis member having internal threads, and a ram shaft having one or more external splines with threads formed on the splines. The threads on the splines mate with the internal threads of the ram axis member. Further included is a ram shaft rotation gear having internal splines, where the internal splines of the ram shaft rotation gear is adapted for meshing with the external splines of the ram shaft. A first drive means rotatably drives the ram axis member, whereby when the ram axis member is rotated, the ram shaft is moved axially via the internal threads and spline threads. A second drive means rotatably drives the ram shaft rotation gear, whereby when the ram shaft rotation gear is rotated, the ram shaft is rotated with respect to the ram axis member. The ram shaft is adapted for connection thereto of the tool, whereby the tool is axially movable and rotatable by the first and second drive means.

According to another feature of the invention, disclosed is apparatus for moving a tool. The apparatus includes a ram axis member having at least one set of threads, and the ram axis member is adapted for being rotatably driven. Included also is a ram shaft having an arrangement of threads with splines formed through the threads and generally orthogonal to the threads, where the threads of the ram shaft mate with the threads of the ram axis member so that telescopic movement therebetween can be achieved when the ram axis member is rotatably driven. The ram shaft is adapted for driving the tool. Also included is i) means for rotating the ram shaft using the splines to thereby rotate the tool about an axial axis of the ram shaft; and ii) means for rotating the ram axis member to thereby move the tool axially along the axial axis of the ram shaft.

According to a further feature of the invention, disclosed is apparatus for moving a tool, where the apparatus includes a tubular ram axis member having external drive threads and internal threads; a ram drive gear having threads mating with the external threads of the tubular ram axis member; a motor for driving the ram drive gear; a tubular ram shaft having external threads mating with the internal threads of the tubular ram axis member, and having splines extending generally orthogonally through the external threads; a ram shaft rotation gear having internal splines mating with the splines of the tubular ram shaft, the ram shaft rotation gear having gear teeth; a ram rotate gear mating with the gear teeth of the ram shaft rotation gear; a motor for driving the ram rotate gear; a cross slide assembly mounted to the tubular ram shaft, the cross slide assembly adapted for holding the tool; and a motor mounted so as to be rotated when the tubular ram shaft is rotated, the motor having a shaft for driving the cross slide assembly to move the tool radially with respect to an axial axis of the tubular ram shaft.

According to a further feature of the invention, disclosed is a method for moving a tool. The method includes the steps of providing a ram axis member having drive threads; providing means for rotationally driving the ram axis member using the drive threads; providing a ram shaft having threads, and splines formed generally orthogonal through the threads of the ram shaft; coupling the ram axis member to the ram shaft; rotating the ram shaft by using the splines to rotate the ram shaft; moving the ram shaft axially using the threads of the ram shaft; and mounting a tool to the ram shaft, whereby the tool moves in correspondence with the ram shaft.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 3a is an exploded view of some of the components of the ram and rotate/feed assembly constructed according to the invention;

FIG. 3b is a sectional view of the main shaft taken along line 3b-3b of FIG. 3a;

FIG. 3c is a sectional view of the main shaft taken along line 3c-3c of FIG. 3a;

FIG. 3d is an end view of the main shaft rotation gear;

FIG. 6a is an end view of the cross slide motor mount shaft;

FIG. 6b is a side view of the various components associated with the cross slide motor mount shaft;

FIG. 6c is an end view of the cross slide motor mount shaft, taken along line 6c-6c of FIG. 6b;

DETAILED DESCRIPTION OF THE INVENTION

Figure 1:
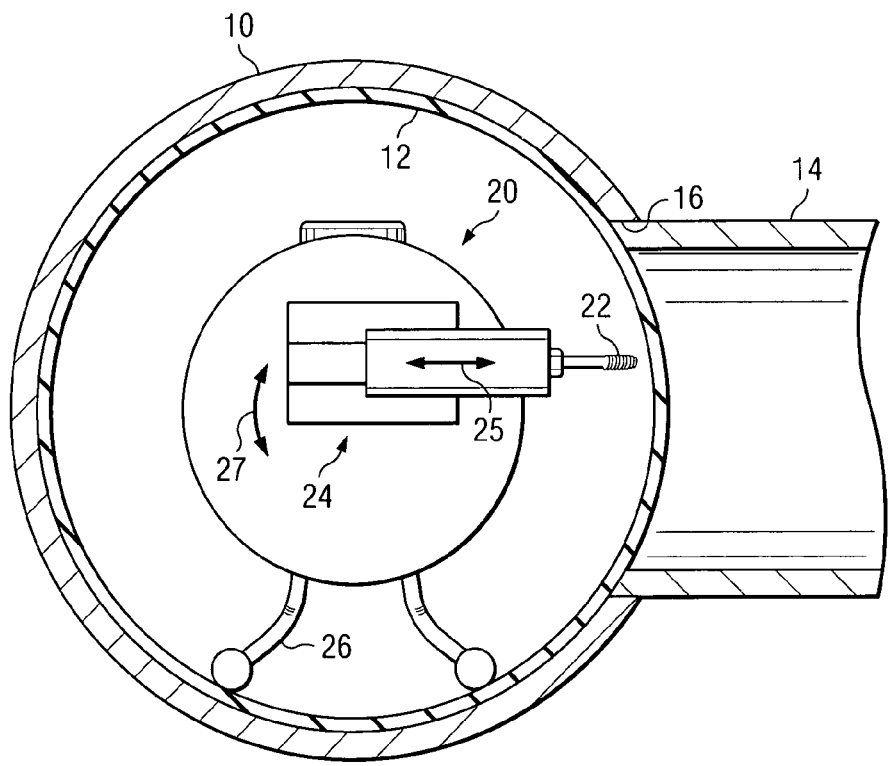
FIG. 1 is an end view of a main pipe lined with a liner, and connected to a lateral, with a cutting machine in a position to reinstate the lateral.

With reference to FIG. 1, there is shown an underground main 10 that has been retrofitted with a plastic sleeve or liner 12. The manner in which plastic sleeves 12 are installed in broken or deteriorated mains is well known in the art. Connected to the main 10 is a lateral pipe 14. The main 10 has an opening 16 therein in alignment with the lateral 14 so that the liquid can flow from the lateral 14 to the main 10. When the plastic sleeve 12 is cured in place in the main 10, the opening 16 is closed and must be reinstated by a cutting machine 20. The reinstatement cutting machine 20 is equipped with a bit 22 or other type of cutting device that is adapted for cutting the plastic material of the sleeve 12. The bit 22 is rotated by an air-driven motor, and is moved in a circular path by various movements imparted to the cross slide assembly 24 that holds the bit 22. As will be described below, the bit 22 is moved radially inwardly and outwardly by a male and female dovetail slide mounted on the cross slide assembly 24. The radial movements of the bit 22 are shown by arrow 25. The cross slide assembly 24 and thus the bit 22 are rotated about the longitudinal axis of the reinstatement cutting machine 20 by rotation of a main shaft. The rotational movements of the cross slide assembly 24 and the bit 22 are shown by arrow 27. Lastly, the cross slide assembly 24 and the cutting bit 22 are moved axially along the length of the reinstatement cutting machine 20 by axial movements of the main shaft via a threaded spline arrangement to be described below. The longitudinal or axial movements of the cross slide assembly 24 and the bit 22 would be in and out of FIG. 1. Accordingly, the bit 22 can be moved in three different planes in order to cut a circular opening in the plastic sleeve 12, all without moving the reinstatement cutting machine 20 itself. The reinstatement cutting machine 20 may be on the order of seventy pounds, or heavier, and thus remains steady in the plastic liner 12 during the cutting operation.

Figure 2:
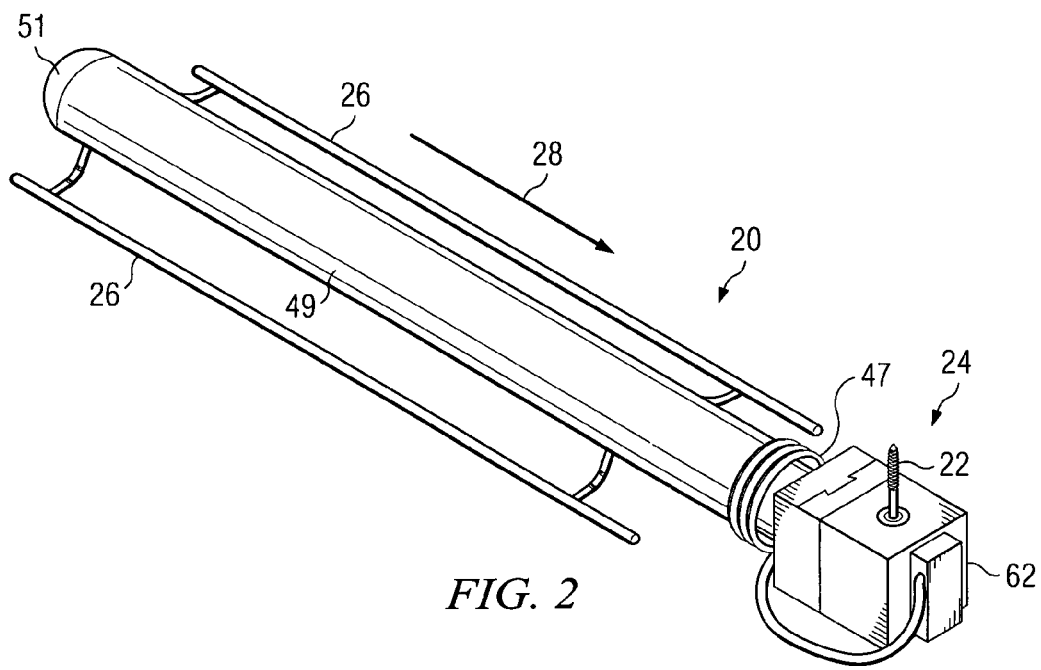
FIG. 2 is a view of the various parts of the cutting machine embodying various features of the invention.

The reinstatement cutting machine 20 is moved along the plastic liner 12 by a pair of skids, one shown as reference character 26. The reinstatement cutting machine 20 can be moved along the plastic liner 12 by pulling the same behind a video camera. The reinstatement cutting machine 20 could of course be self-propelled and moved under its own power. It is typical that the reinstatement cutting machine 20 be accompanied by a camera or other video equipment to remotely monitor and control the cutting process. The video equipment as well as pressurized air hoses, electrical umbilical cords and other cords can be towed by the reinstatement cutting machine 20 as it is being pulled through the main 10 by the cable. FIG. 2 is a view of the reinstatement cutting machine 20 that can be pulled in a main 10 in the direction of the arrow 28. In this instance, the reinstatement cutting machine 20 could be towed either by a self-propelled video camera, or by cables. In other instances, the reinstatement cutting machine 20 could move in a direction opposite that indicated by arrow 28, and tow the video camera. Tow cables can be connected to the reinstatement cutting machine 20 either to the back end thereof, or to the cross slide assembly 24.

The reinstatement cutting machine 20 includes a two-part housing constructed from a billet of stainless steel. The two-part housing includes a main body 49 for supporting therein a rain and rotate/feed assembly 30 (shown in FIG. 3a), and includes a motor mount and drive bulkhead 51 for supporting the three DC motors therein. The motor mount and drive bulkhead 51 is bolted to the main body 49 and sealed thereto with an o-ring, or other suitable sealing mechanism. While not shown, a water proof electrical connector is attached to the back end of the motor mount and drive bulkhead 51. The electrical connector provides a connection between an umbilical electrical cord and the three DC motors mounted in the motor mount and drive bulkhead 51. Also mounted to the back of the motor mount and drive bulkhead 51 is an air pressure connection for connecting to an umbilical air hose. The air pressure connection is connected to a sealed passage formed through the motor mount and drive bulkhead 51 and through the main body 49. The sealed passage in the two-part housing terminates in a connection at the front of the main body 49. An coiled air hose 47 is connected to the passage in the two-part housing of the reinstatement cutting machine 20 and to the cross slide assembly 24. As noted above, the pressurized air is utilized to drive the air-driven motor 62 of the cross slide assembly 24 which, in turn, rotates the bit 22 at a high RPM. As will be described more fully below, the cross slide assembly 24 can be moved axially in and out of the main body 49, much like the plunger of a hydraulic cylinder, or rotated in an angular manner about the longitudinal axis of the main body 49. This movement in two directions can be employed to correspondingly move a tool fixed to the end of the main shaft 42. In addition, the cross slide assembly 24 includes a part to which a tool, such as the cutting motor 62 is fastened, that moves in a radial direction along the axis of the bit 22. Accordingly, three degrees of movement of the bit 22 are also provided.

In accordance with an important feature of the invention, the cross slide assembly 24 and the bit 22 are mounted to the ram and rotate/feed assembly 30, shown in FIG. 3a. The cross slide assembly 24 is described in more detail below. The ram and rotate/feed assembly 30 includes a ram axis gear tube 32 having external gear teeth 34 formed at a rear end thereof. The gear teeth 34 of the ram axis gear tube 32 mesh with a ram drive gear shaft 36. The ram drive gear shaft 36 is driven by a reversible DC motor mounted in the motor mount and drive bulkhead 51. As will be described more fully below, the rotational movements of the ram axis gear tube 32 produces axial movements of the main shaft 42, and thus corresponding axial movements of the cross slide assembly 24 and bit 22. In FIG. 1, the axial movements of the main shaft 42 within the ram axis gear tube 32 causes movement of the bit 22 in and out of the drawing of FIG. 1. The ram axis gear tube 32 includes an opening 19 in the rear end thereof. A needle bearing is fixed within the opening 19 to provide a bearing support to the end of the ram axis gear tube 32. The needle bearing engages with a tubular support fixed to the motor mount and drive bulkhead 51.

The ram axis gear tube 32 also has a bore formed therethrough. A cross slide motor mount shaft 70 (FIG. 6b) is inserted into the bore of the ram axis gear tube 32. The ram axis gear tube 32 of FIG. 3a is constructed with a threaded nut 45 fixed to the front end thereof in the manner of a spanner nut. That is, the threaded nut 45 has a certain degree of wobble with respect to the ram axis gear tube 32. As the ram axis tear tube 32 is rotated by the ram drive shaft 36, the threaded nut 45 is carried with it. The internal threads of the threaded nut 45 mesh with threads 48 formed on a splined portion of a main shaft 42. Accordingly, when the ram axis gear tube 32 is rotated, the main shaft 42 is telescopically moved in and out of the ram axis gear tube 32. A ball bearing thrust washer 43 is positioned between the threaded nut 45 and the main shaft rotation gear 46. Another similar thrust bearing is located on the other side of the main shaft rotation gear 46 and abuts against a shoulder formed internal in the main body 49. The main shaft rotation gear 46 is thus constrained from axial movement, but is rotatable by the ram rotate shaft 52.

As noted above, the main shaft 42 is constructed with external splines 44, as well as acme threads 48 formed on the splines 44. Threads other than the acme type can be utilized. The main shaft 42 is thus constructed with longitudinal splines 44, and with acme threads 48 formed on the splines. This is also shown in FIG. 3b. The splines 44 allow the main shaft 42 to be rotated independently of the ram axis gear tube 32. As noted above, the rotational movement of the main shaft 42 is achieved by rotation of a main shaft rotation gear 46. The main shaft rotation gear 46 has internal splines 39, as shown by the side view of FIG. 3d. The internal splines 39 of the main shaft rotation gear 46 mate with the external splines 44 of the main shaft 42. The main shaft rotation gear 46 also has external gear teeth 50 formed therearound. The external gear teeth 50 of the main shaft rotation gear 46 mate with the ram rotate gear shaft 52. The ram rotate gear shaft 52 is driven by a DC motor (not shown) mounted in the motor mount and drive bulkhead 51. The motor mount and drive bulkhead 51 is bolted to the left end of the main body 49, shown in FIG. 3a.

The rotation of the main shaft rotation gear 46 causes rotational movement of the main shaft 42 as well as the cross slide assembly 24 fastened thereto. Thus, when the main shaft rotation gear 46 is rotated, the bit 22 moves clockwise or counterclockwise according to arrow 27 of FIG. 1, much like the hand of a clock. The angular movements of the bit 22 are effective to form vertical cuts in the plastic sleeve 12. It can be seen that the ram and rotate/feed assembly 30 is constructed in an efficient manner to provide two-axis movements of the bit 22, corresponding to axial and rotational movements. The outer end of the main shaft 42 includes a hollow part 53 and a reduced diameter hollow stub 55. As will be described below, the cross slide assembly 24 is mounted to the stub 55 of the main shaft 42.

The main shaft 42 is constructed with a bore 54 therethrough. A substantial length of the main shaft 42, including the front end thereof, is constructed as shown in FIG. 3b. The back end of the main shaft 42 is constructed with internal splines, as shown in FIG. 3c. The bore 54 shown in FIG. 3b receives therein a cross slide motor mount tubular member 70, shown in FIG. 6b. The cross slide motor mount tubular member 70 includes external splines mateable with the internal splines 41 of the main shaft 42. A motor shaft extends through the cross slide motor mount tubular member 70 and drives a linear gear 68 on the cross slide assembly 24. The DC motors referred to herein may be equipped with internal gear reduction apparatus to achieve the appropriate rotational speeds of the various gear shafts. As will be described below, the motor shaft is effective to move the cutting bit 22 radially, via the cross slide assembly 24, in the direction indicated by arrow 25 of FIG. 1.

Figure 4:
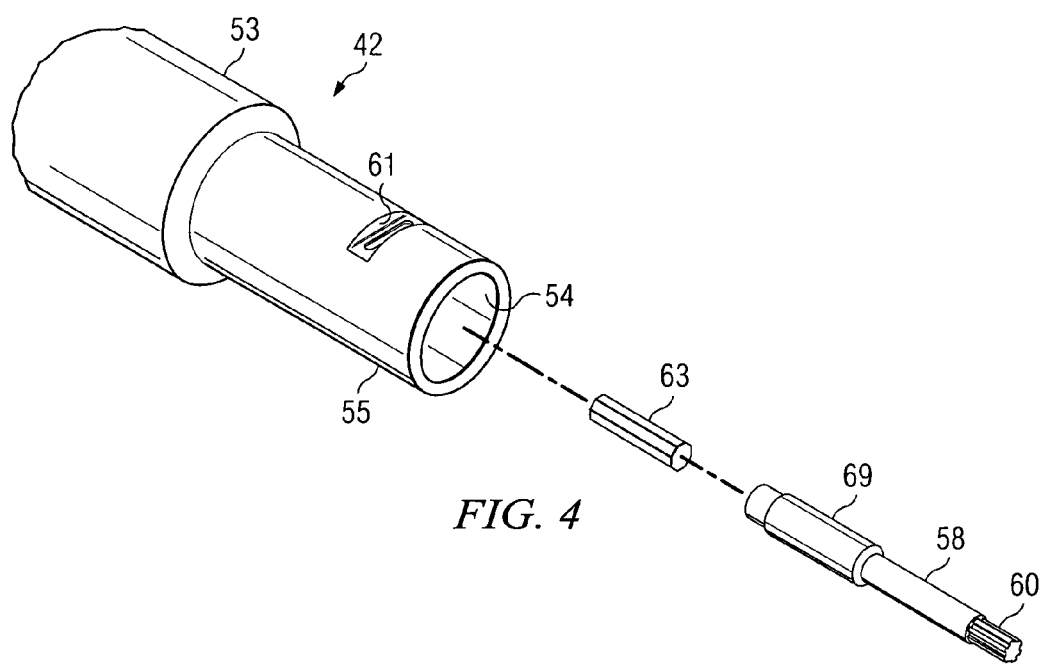
FIG. 4 illustrates an end of the main shaft with related components.

FIG. 4. Illustrates the details of the front end of the main shaft 42. The main shaft 42 includes a polished cylindrical surface 53 that slides within a seal formed in the main body 49 during axial movement of the main shaft 42. The stub 55 includes a recessed area 61 for receiving therein a bolt used for fastening the cross slide assembly 24 to the stub 55 of the main shaft 42. A hex rod 63 extends through the ram axis gear tube 32 and the main shaft 42 and is connected to a hex receptacle (not shown) in a pinion gear 60. The pinion gear 60 includes a bearing area 69. A pair of bearings held within the internal bore 54 of the stub 55 support the pinion gear 60 during rotation. The pinion gear 60 drives the cross slide assembly 24, shown in FIG. 5.

Figure 5:
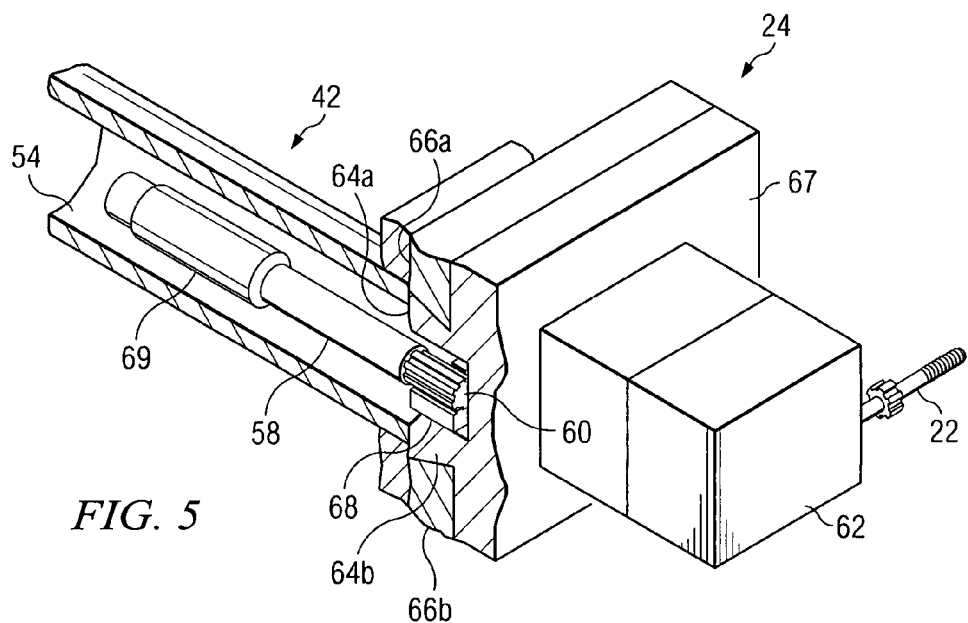
FIG. 5 is an isometric view of a cross slide assembly adapted for radially moving the air-driven motor and bit.

FIG. 5 illustrates the details of the cross slide assembly 24, a dove-tail part of which is moved in a radial direction with respect to the underground main 10. The cross slide assembly 24 includes a platform 67 to which the air-driven motor 62 is fixed. The air-driven motor 62 rotates the bit 22 at a high rate of speed. A chuck attached to the air-driven motor 62 holds the cutting bit 22. The platform 67 includes spaced-apart dove-tail rails 64a and 64b that mate with corresponding spaced-apart dove tail rails 66a and 66b. The dove-tail rails 66a and 66b are fixed to the stub end 55 of the main shaft 42 by other apparatus shown in FIG. 7a-7c. The mating dove-tail arrangement affords precision radial movements of the air driven motor 62 and the cutting bit 22. The platform 67 includes linear gear teeth 68 that mate with the teeth of the pinion gear 60. The teeth of the of the pinion gear 60 and the linear teeth 68 of the platform 67 function much like that of a rack and pinion assembly. Thus, as the radial drive motor 74 (FIG. 6b) is operated in either direction, the platform 67 and thus the air-driven motor 62 and bit 22 move radially in and out toward the wall of the plastic liner 12.

For the sake of completeness, the various movements of the cutting bit 22 are controlled by a remotely-located joystick and switch arrangement. The forward and backward movement of the joystick control the forward and backward movement of the main shaft 42, via the gear shaft 52. This controls the axial movement of the cross slide assembly 24 and the cutting bit 22. The left and right movements of the joystick control the rotational movements of the bit 22 along the arrow 27 of FIG. 1. A rocker type thumb-operated switch on the joystick controls the pinion gear 60 and thus the radial movements (arrow 25) of the bit 22 toward and away from the plastic liner 12. A trigger on the joystick can be operated by the index finger of the operator to control air pressure coupled to the air-driven motor 62. Thus, the movements of the bit 22 can all be accomplished with one hand of the operator.

Figure 8A:
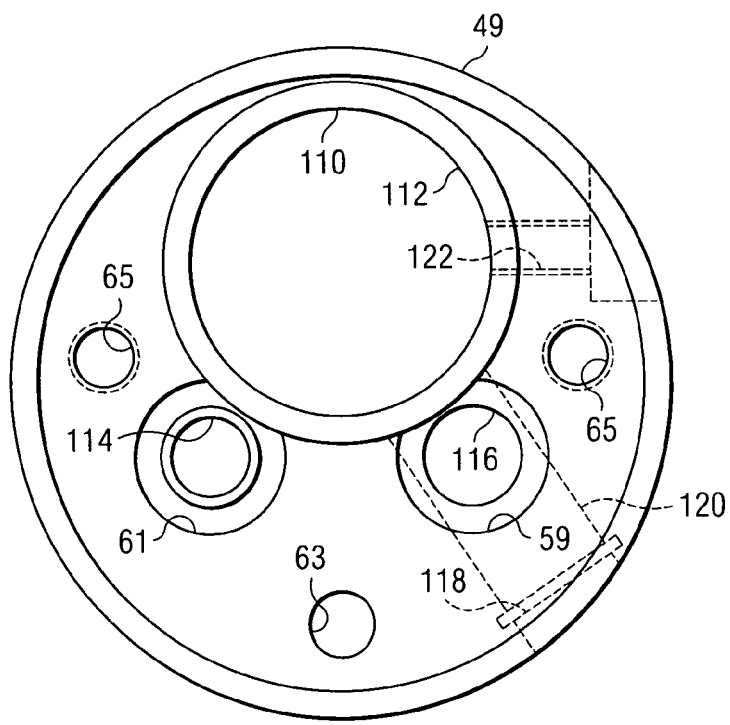
FIGS. 8a and 8b are respective rear and frontal views of the main body portion of the reinstatement cutting machine.
Figure 8B:
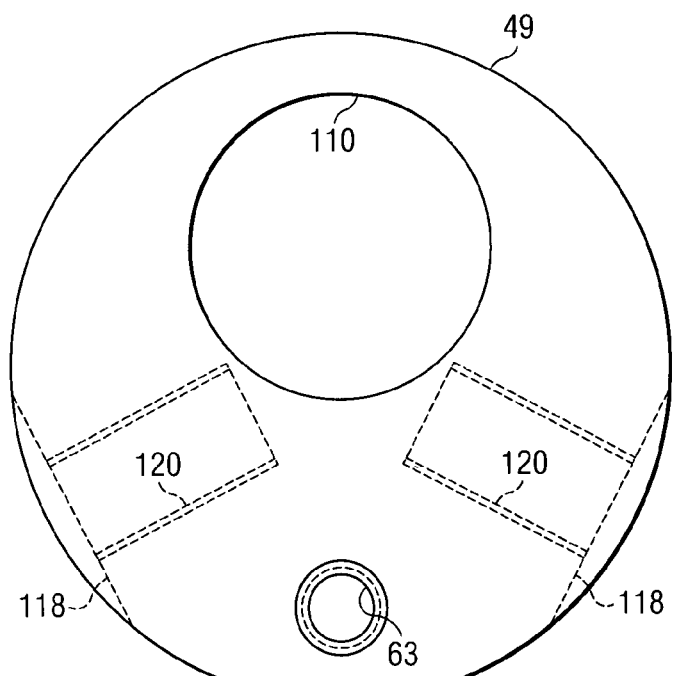

With reference back to FIG. 3a, the ram and rotate/feed assembly 30 is mounted in the main body 49 of the reinstatement cutting machine 20. The main body 49 is constructed from a cylinder of stainless steel with various holes bored therethrough. The main body 49 is bolted to a motor mount and drive bulkhead 51 (FIG. 2) which houses the three DC motors that drive respective gear shafts 36, 52 and 60. The ram and rotate/feed assembly 30 fits into a main bore 57 formed entirely through the main body 49. The ram drive shaft 36 and ram rotate shaft 52 fit through the respective bores 61 and 59. Formed through the main body 49 is a passage 63 for carrying air pressure to the air-driven motor 62. Two other threaded holes are formed in the main body, one shown as numeral 65, for bolting the motor mount and drive bulkhead 51 to the main body 49. The connection between the main body 49 and the motor mount and drive bulkhead 51 is sealed with one or more o-rings. The skids 26 of the reinstatement cutting machine 20 are mounted to the main body 49 and the motor mount and drive bulkhead 51. The main body 49 includes various internal bearings for allowing rotation of the ram axis gear tube 32 and the main shaft 42. The end structures of the main body 49 are shown in FIGS. 8a and 8b.

FIG. 6a illustrates an end view of the cross slide motor mount shaft 70 employed for driving the cross slide assembly 24. The cross slide motor mount shaft 70 includes a flange 72 to which the DC motor 74 is attached by screws, or the like. The DC motor 74 includes a slip ring arrangement 76 for coupling DC current to the motor 74. The DC motor 74 is fixed to the cross slide motor mount shaft 70, and thus when the shaft 70 is rotated by the main shaft 42, the DC motor 74 rotates with the cross slide motor mount shaft 70. In practice, the DC motor 74 is located in the motor mount and drive bulkhead 51. The cross slide motor mount shaft 70 includes an annular groove 76 for receiving an o-ring for sealing to the motor mount and drive bulkhead 51. The DC motor 74 drives the hex-shaped shaft 78 that extends through the ram and rotate/feed assembly 30. The motor 74 may be equipped with internal gear reduction apparatus.

The cross slide motor mount shaft 70 includes a bore 80 formed therethrough, and splines 82 formed externally, as shown in FIG. 6c. The external splines 82 mate with the internal splines 41 (FIG. 3c) formed in the rear portion of the main shaft 42. Extended through the bore 80 of the cross slide motor mount shaft 70 is the hex rod 63. The hex rod 63 has formed in an end thereof a hex receptacle 84 for receiving therein the hex shaft 78 of the motor 74. The other end 86 of the hex rod 63 fits within a hex receptacle 88 of the pinion gear 60. With this arrangement, the motor 74 drives the pinion gear 60 by way of the hex rod 63.

The advantage of allowing the DC motor 74 itself to rotate with the main shaft 42, is that this arrangement allows the cross slide assembly 24 to rotate about an axial axis without also moving the bit 22 in a radial direction. Otherwise, rotation of the main shaft 42 would alone cause corresponding rotation of the cross slide assembly 24 and thus relative movement between the pinion gear 60 and the linear gear 68 formed in the dove tail slide. This unintended relative movement between the pinion gear 60 and the linear gear 68 would thus cause the platform 60 of the cross slide assembly 24 to move somewhat and thus move the bit 22 in a radial direction. By moving the motor 74 with the main shaft 42 when the latter is rotated, the radial movement of the bit 22 is independent of the rotational movement of the cross slide assembly 24.

Figure 7A:
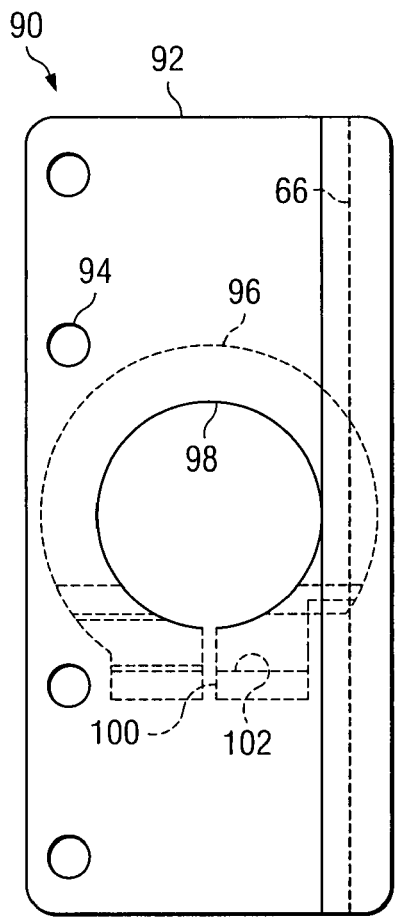
FIGS. 7a, b and c are respective frontal, side and end views of a part of the cross slide assembly that is fixed to the stub of the main shaft.
Figure 7B:
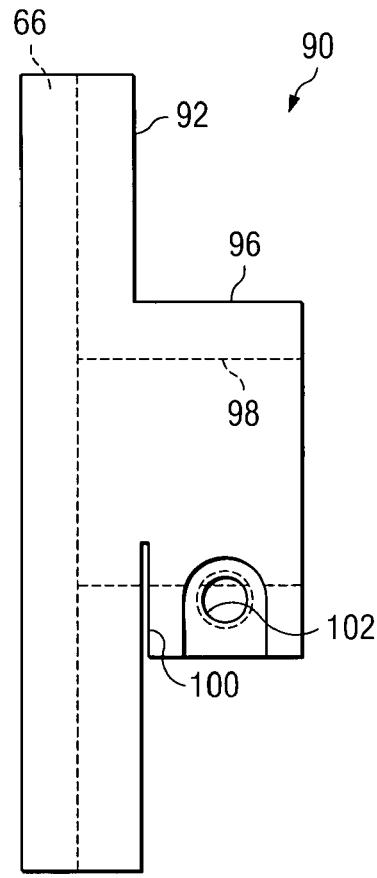
Figure 7C:
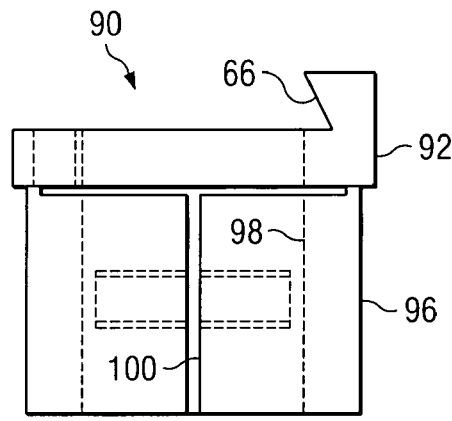

FIGS. 7a-7c illustrate the part of the cross slide assembly 24 that is fixed to the stub 55 of the main shaft 42. The cross slide mounting bracket 90 includes a plate 92 to which one dove tail 66 is formed. The other dove tail is not shown, but is a separate member bolted to the plate 90 by way of the bolt holes 94. Formed with the plate 92 is a collar 96 with a bore 98 formed therethrough. The collar 96 fits over the stub 55 of the main shaft 42. Cut in the collar 96 is a slot 100. A bolt hole 102 is formed in the collar 96 so that it passes through the slot 100. One portion of the bolt hole 100 is threaded, while the other part of the bolt hole 100 is not threaded. The bolt hole 100 is located in the collar 96 so that the bolt (not shown) also passes through the indention 61 formed in the stub 55 of the main shaft 42. The cross slide mounting bracket 90 is fastened to the main shaft 42 by slipping the collar 96 over the stub 55, passing a bolt through the unthreaded part of the bolt hole 102, through the indention 61 of the stub 55, and into the threaded part of the bolt hole 102. The bolt can be tightened to thereby squeeze the collar 96 and fix it onto the stub 55.

FIGS. 8a and 8b illustrates the detailed construction of the ends of the main body 49 that houses the ram and rotate/feed assembly 30. The main body 49 includes, as viewed from the rear (FIG. 8a), a large bore 110 through which the ram and rotate/feed assembly 30 is inserted. A shoulder 112 is formed in the main body 49 against which a ball bearing thrust washer abuts, and provides a thrust bearing for the main shaft rotation gear 46. The main body 49 is fastened to the motor mount and drive bulkhead 51 using the threaded bolt holes 65. The bore 61 receives the gear of the ram drive shaft 36, the bore 59 receives the gear of the ram rotate shaft 52. The smaller bore 114 forms a bearing for the stub end of the ram drive shaft 36. Similarly, the smaller bore 116 forms a bearing for the stub end of the ram rotate shaft 52. The passage 63 couples pressurized air through the main body 49 from the front end to the back end thereof. Formed on the side of the main body 49 are flattened areas 118 into which threaded holes 120 are formed. The skids 26 of the reinstatement cutting machine 20 are bolted into the threaded holes 120. A grease fitting is fastened in a threaded hole 122 to allow the main shaft 42 to be greased.

The front of the main body 49 is illustrated in FIG. 8b. The bore 110 has installed therein a seal (not shown) through which the polished cylindrical part 53 of the main shaft 42 slides during axial movement of the cross slide assembly 24. Those skilled in the art will appreciate that there are various bearings and seals and other parts or apparatus which are not shown, but which would be apparent to those skilled in the art in order to make the reinstatement cutting machine 20 liquid tight.

While the foregoing describes the features of the invention embodied in a reinstatement cutting machine, the principles and concepts of the invention can be employed in many other machines and applications. In addition, not all of the various features need be used in a single application. To that end, the ram axis feed tube can be rotated by means other than the drive threads, such as friction drive, belt drive, chain drive direct drive, etc. The same is true of the drive of the main shaft. Moreover, the various inside and outside threads of the ram axis gear tube and the main shaft can in certain situations be located on the members at different locations. Those skilled in the art may prefer to mount the tool to be moved at locations other than at the stub end of the main shaft. Many other variations are possible without departing from the spirit of the invention.

While the preferred and other embodiments of the invention have been disclosed with reference to specific cutting machine structures, it is to be understood that many changes in detail may be made as a matter of engineering choices without departing from the spirit and scope of the invention, as defined by the appended claims.

What is claimed is:

1. A method of moving a device, comprising the steps of:
   providing a device movement shaft adapted for moving said device axially with respect to an axial axis of said shaft and for rotating said device with respect to the axial axis of said shaft;
   providing spiral threads of the type having apexes and valleys on said shaft and providing splines formed through said spiral threads;
   rotating said shaft using said splines to cause rotation of the device;
   moving said shaft axially to cause axial movement of said device by rotating a single nut having threads with apexes and valleys that mesh with the valleys and apexes, respectively, of the spiral threads of said shaft;
   allowing said shaft to be moved axially independently of rotational movement of said shaft so that said shaft can be moved axially with respect to said nut without rotating said shaft.

2. The method of claim 1, further including rotating said shaft with a first motor, and moving said shaft axially with a second, different motor.

3. The method of claim 1, further including axially moving said shaft using a threaded member engaged with said spiral threads, and rotating said shaft using a splined member engaged with the splines of said shaft.

4. The method of claim 3, further including providing an internally threaded elongate tubular member as said threaded member, and providing gear teeth around an outer portion of said elongate tubular member for use in rotating said elongate tubular member.

5. The method of claim 3, further including rotating said splined member in opposite directions independently of the direction of rotation of said threaded member.

6. The method of claim 1, further including mounting said device to said shaft, and moving said device by rotating said shaft and by axially moving said shaft.

7. The method of claim 1, further including providing said shaft with a bore formed axially therethrough.

8. The method of claim 1, further including using a threaded engagement between said nut and said shaft without using balls and grooves.

9. The method of claim 1, further including using a motor with a rotatable shaft, and a case, so that the motor case rotates with rotation of said device movement shaft, extending a drive shaft through a bore in said device movement shaft, connecting said drive shaft to the rotatable shaft of said motor, and allowing telescopic movements of said drive shaft during axial movements of said device movement shaft.

10. The method of claim 9, further including mounting the device to an end of said device movement shaft, and driving a mechanism of the device with rotational movements of said drive shaft as driven by said motor.

11. The method of claim 9, further including using internal longitudinal splines in said device movement shaft, using an externally splined motor mount shaft that mates with the internal splines of said device movement shaft, and mounting the motor case to said externally splined motor mount shaft to allow said motor case to rotate with said device movement shaft.

12. A method of moving a device, comprising the steps of:
    providing a device movement shaft adapted for moving said device axially with respect to an axial axis of said shaft and for rotating said device with respect to the axial axis of said shaft;
    providing said shaft with spiral threads and with splines formed through said spiral threads;
    rotating a splined member engaged with said splines, without using balls engaging the splines of the splined member and the splines of said shaft, to cause rotation of said shaft;
    rotating a threaded member engaged with said external spiral threads to cause axial movement of said shaft;
    providing a first motor for causing rotation of said threaded member to thereby axially move said shaft;
    providing a second, different motor for causing rotation of said splined member to thereby cause rotation of said shaft; and
    whereby said shaft can be moved axially with respect to said threaded member without rotating said shaft.

13. The method of claim 12, further including rotating said threaded member in one direction or in an opposite direction, both said directions independently of any direction of rotation of said splined member.

14. The method of claim 12, further including rotating said threaded member when said splined member is held stationary, and rotating said splined member when said threaded member is held stationary.

15. The method of claim 12, wherein said shaft defines a first shaft, and further including providing said first shaft with a bore therein, and further including providing a second shaft extended in said bore for moving said device.

16. The method of claim 15, further including rotating said second shaft for moving said device in a radial direction.

17. The method of claim 16, further including mounting a cross slide mechanism to said first shaft, mounting said device to said cross slide mechanism, and rotating said second shaft to move said device in a radial direction.

18. The method of claim 12, further including providing a third motor with a rotatable drive shaft, and a drive member coupled to said motor drive shaft, and extending said drive member through a bore of said device movement shaft for providing a drive force to said device, whereby said device can be rotated by said device movement shaft, moved axially by said device movement shaft and can use said drive force of said third motor.

19. The method of claim 12, further using an external polished surface on said shaft, and a seal for sealing the polished surface of said shaft to a housing, whereby said shaft can rotate and move axially with respect to said seal and maintain the threads and the splines of said shaft sealed within said housing.

20. A method of moving a device, comprising the steps of
providing a shaft adapted for moving said device, and providing external spiral threads on said shaft and providing external splines formed through said external spiral threads;
rotating an internally splined member engaged with said external splines to cause rotation of said shaft;
rotating an internally threaded tubular member engaged with said external spiral threads to cause axial movement of said shaft;
providing a first motor with a gear for engaging a toothed portion of said threaded tubular member to thereby cause rotation of said threaded tubular member and axially move said shaft;
providing a second, different motor with a gear for engaging a toothed portion of said splined member to thereby cause rotation of said splined member and cause rotation of said shaft; and
mounting a cross slide mechanism to said shaft, where said cross slide mechanism is adapted for holding a tool, and said cross slide mechanism is adapted for moving said tool in a radial direction, wherein said cross slide mechanism defines said device.

\* \* \* \* \*